(12) United States Patent
Chakraborty et al.

(10) Patent No.: US 12,005,532 B2
(45) Date of Patent: Jun. 11, 2024

(54) SYSTEMS, METHODS, AND APPARATUSES, OF AN ARC WELDING (AW) PROCESS AND QUALITY MONITORING

(71) Applicant: GM GLOBAL TECHNOLOGY OPERATIONS LLC, Detroit, MI (US)

(72) Inventors: Debejyo Chakraborty, Novi, MI (US); Miguel Arturo Saez, Clarkston, MI (US); John Patrick Spicer, Plymouth, MI (US); Pei-chung Wang, Troy, MI (US); Spyros P Mellas, Waterford, MI (US); Wayne Cai, Troy, MI (US); James M Ward, Almont, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 258 days.

(21) Appl. No.: 17/405,433

(22) Filed: Aug. 18, 2021

(65) Prior Publication Data
US 2023/0056400 A1    Feb. 23, 2023

(51) Int. Cl.
*B23K 9/095* (2006.01)
*B23K 9/12* (2006.01)

(52) U.S. Cl.
CPC .......... *B23K 9/0956* (2013.01); *B23K 9/0953* (2013.01); *B23K 9/125* (2013.01)

(58) Field of Classification Search
CPC .. B23K 31/003; B23K 31/125; B23K 9/0953; B23K 9/0956; B23K 9/125; G01N 21/8851
See application file for complete search history.

(56) References Cited

U.S. PATENT DOCUMENTS

| 10,150,182 | B2* | 12/2018 | Ramsayer | B23K 31/003 |
|---|---|---|---|---|
| 2017/0032281 | A1* | 2/2017 | Hsu | G05B 19/41875 |
| 2018/0001422 | A1* | 1/2018 | Rajagopalan | B23K 26/282 |
| 2019/0271669 | A1* | 9/2019 | Suter | G05B 19/406 |
| 2020/0114450 | A1* | 4/2020 | Kulakowski | B23K 9/0956 |
| 2022/0032397 | A1* | 2/2022 | Ivkovich | G06T 7/0008 |
| 2022/0126405 | A1* | 4/2022 | Maslar | B23K 26/22 |

FOREIGN PATENT DOCUMENTS

WO    WO-2016075518 A1 *  5/2016  .......... B23K 31/125

* cited by examiner

*Primary Examiner* — Janie M Loeppke
*Assistant Examiner* — Abigail H Rhue
(74) *Attorney, Agent, or Firm* — Lorenz & Kopf LLP

(57) ABSTRACT

Systems, methods, and apparatuses of a welding system are disclosed and include a first stage of a scanning device for scanning weld parts to generate a three-dimensional (3D) profile of a weld target wherein the 3D profile captures matching imperfections of a meeting together of the set of weld parts when performing the weld operation; and the second stage of a monitoring device to monitor the weld operation and to generate a data of high-resolution measurements of the weld operation; wherein the first stage further includes the monitoring device determining a weld schedule based on the 3D profile, and to adjust the weld schedule while the weld operation progresses to adapt to predicted distortion based on the 3D profile and to sensed distortion; wherein the second stage further includes a plurality of sensors to sense a set of components associated with the weld operation to generate high-resolution data of measurements.

20 Claims, 4 Drawing Sheets

SYSTEMS, METHODS, AND APPARATUSES, OF AN ARC WELDING (AW) PROCESS AND QUALITY MONITORING

INTRODUCTION

The technical field generally relates to a welding process, and more particularly relates to systems, methods, apparatuses to monitor an Arc Welding (AW) process and predict weld quality.

Collaborative processes in automotive plants with the use of automation are becoming more commonplace and integration of more advanced manufacturing processes is required to ensure the quality of production products at a plant. To meet these goals, robotic welding is becoming a viable automation tool that can be used in the automotive industry assembly process but issues remain such as imperfect welds in production lines.

There is a need for better data analysis of welding processes to detect irregularities in welded parts such as improper weld locations, weak welds, etc. to increase the overall quality and efficiency of welded production products. For example, in-vehicle assembly, welding mistakes can delay vehicle production and increase production costs.

It is desirable to provide more advanced analysis during welding processes to overcome inefficiencies that exist in welding processes in current production lines by providing a multistage welding process composed of multiple stages in welding for use in a production line which includes stages directed to parts positioning, weld monitoring, process monitoring, and post-weld inspection to enhance the weld quality.

Furthermore, other desirable features and characteristics of the present invention will become apparent from the subsequent detailed description and the appended claims, taken in conjunction with the accompanying drawings and the foregoing technical field and background.

SUMMARY

A system, method, and apparatus of a welding process to ensure weld quality is disclosed.

In at least one exemplary embodiment, a welding system is provided.

The weld system at least includes a first stage of a scanning device for scanning a workpiece including a set of weld parts to generate a three-dimensional (3D) profile of a weld target wherein the 3D profile captures matching imperfections caused by a meeting of the set of weld parts when performing a weld operation for joining the set of weld parts; and a second stage of a monitoring device to monitor the weld operation and to generate a data of high-resolution measurements of the weld operation; wherein the first stage further includes the monitoring device to determine a weld schedule based on the 3D profile of the weld target, and to adjust the weld schedule while the weld operation is in progress to adapt to a predicted distortion in a shape of the weld based on the 3D profile of the target weld, and to sensed distortion during the weld operation resulting from a combination of forces caused by a weld between the set of weld parts and a clamping force exerted on the workpiece; wherein the second stage further includes a plurality of sensors configured to sense a set of components associated with the weld operation to generate high-resolution data of measurements from direct and indirect sensing of measurements of the set of components associated with the weld operation in contrast to a low-resolution data of measurements provided by a weld controller.

In at least one exemplary embodiment, the welding system in the second stage, the plurality of sensors that provides the high-resolution data of measurements includes at least one or more of a set of sensors to provide direct measurements of the weld operation of a high-resolution current sensor, a high-resolution voltage monitor sensor, and a high-resolution flow sensor.

In at least one exemplary embodiment, the welding system in the second stage, the plurality of sensors that provides the high-resolution data of measurements includes at least one or more of the plurality of sensors to provide indirect measurements of the weld operation of a microphone, a vibration meter, a plasma sensor, an ultra-violet sensor, a strain gauge sensor, a welding reaction force sensor, an electromagnetic spectrometer, a wire feed sensor, and an infrared camera.

In at least one exemplary embodiment, the welding system in the first stage further includes a sensor of a wire to enable by a touch action that impinges at least one weld part of the set of weld parts, to determine a weld part position prior to the weld operation wherein a weld part experiences the clamping force that holds together each weld part of the set of weld parts, and to measure by a tactile sense a change in the shape of the weld part position to determine the distortion in the shape of the weld part; and wherein the second stage further includes the sensor that contains the wire wherein the wire is configured as a consumable electrode that advances to the weld part to deposit a weld bead to form a weld segment of the weld between the set of weld parts and is further configured as a wire feed sensor to provide a measured melt rate of the consumable electrode in the weld operation.

In at least one exemplary embodiment, the welding system includes the microphone which is configured to monitor ultrasonic frequencies and audible range frequencies of noises associated with the weld operation to determine whether a weld segment is compliant; and the strain gauge sensor which is configured to measure a set of measurements exhibited by the weld part during the weld operation to determine a warping of the weld part and whether the warping of the weld part is beyond a compliant level wherein the strain gauge sensor is attached to the weld part.

In at least one exemplary embodiment, the welding system includes the welding reaction force sensor which is configured to determine the strength of the weld segment in contrast to the clamping force applied to the weld part.

In at least one exemplary embodiment, the welding system includes a third stage of the weld system including a processing monitoring module configured to qualify the weld segment formed by the weld operation based on a weld monitoring rule applied to a result of computation using a function of a measured weld part gap schedule.

In at least one exemplary embodiment, the welding system includes the monitoring module which is configured to combine high and low-resolution data from the plurality of sensors and the weld controller to determine a trajectory of a robotic device implemented in the weld operation.

In at least one exemplary embodiment, the welding system includes a fourth stage of the weld system including a post welding inspection module to perform an automated inspection based on an adjusted schedule of the weld segment and the set of weld parts, and by fusing together the high and low-resolution data for quality analysis, to determine if a weld joint is stable, and the weld segment is compliant wherein the quality analysis uses a rule-based schema and a classification algorithm that receives input of fused high and low-resolution data for qualifying and classifying the weld joint.

In at least one exemplary embodiment, a method for monitoring a weld operation is provided.

The method at least includes configuring a weld system by a first stage of a scanning device for scanning a workpiece including a set of weld parts to generate a three-dimensional (3D) profile of a weld target wherein the 3D profile captures matching imperfections caused by a meeting of the set of weld parts when performing the weld operation for joining of the set of weld parts; and configuring of the weld system by a second stage of a monitoring device for monitoring the weld operation and for generating data of high-resolution measurements of the weld operation; configuring the monitoring device by the first stage for determining a weld schedule based on the 3D profile of the weld target, and for adjusting the weld schedule while the weld operation is in progress for adapting to a predicted distortion in a shape of the weld based on the 3D profile of the target weld, and for adapting to sensed distortion during the weld operation resulting from a combination of forces caused by a weld between the set of weld parts and a clamping force exerted on the workpiece; and configuring a plurality of sensors in the second stage for sensing a set of components associated with the weld operation for generating high-resolution data of measurements from direct and indirect sensing of measurements of the set of components associated with the weld operation in contrast to a low-resolution data of measurements provided by a weld controller.

In at least one exemplary embodiment, the method includes configuring, in the second stage, the plurality of sensors for providing the high-resolution data of measurements by at least one or more of a set of sensors providing direct measurements of the weld operation including a high-resolution current sensor, a high-resolution voltage monitor sensor, and a high-resolution flow sensor.

In at least one exemplary embodiment, the method includes configuring, in the second stage, the plurality of sensors for providing the high-resolution data of measurements by at least one or more of the plurality of sensors providing indirect measurements of the weld operation including a microphone, a vibration meter, a plasma sensor, an ultra-violet sensor, a strain gauge sensor, a welding reaction force sensor, an electromagnetic spectrometer, a wire feed sensor, and an infrared camera.

In at least one exemplary embodiment, the method includes configuring a sensor of the first stage including a wire for enabling by a touch action that impinges at least one weld part of the set of weld parts, for determining a weld part position prior to the weld operation wherein a weld part experiences the clamping force that holds together each weld part of the set of weld parts, and for measuring by a tactile sense a change in the shape of the weld part position to determine the distortion in the shape of the weld part; and configuring by the sensor of the second stage that contains the wire wherein the wire is configured as a consumable electrode that advances to the weld part to deposit a weld bead to form the weld segment of the weld between the set of weld parts and is further configured as a wire feed sensor for providing a measured melt rate of the consumable electrode in the weld operation.

In at least one exemplary embodiment, the method includes configuring the microphone for monitoring ultrasonic frequencies and audible range frequencies of noises associated with the weld operation for determining whether the weld segment is compliant; and configuring the strain gauge sensor for measuring a set of measurements exhibited by the weld part during the weld operation for determining a warping of the weld part and whether the warping of the weld part is beyond a compliant level wherein the strain gauge sensor is attached to the weld part.

In at least one exemplary embodiment, the method includes configuring a third stage of the weld system including a processing monitoring module configured for qualifying the weld segment formed by the weld operation based on a weld monitoring rule applied to a result of computation using a function of a measured weld part gap schedule.

In at least one exemplary embodiment, the method includes configuring the process monitoring module for combining high and low-resolution data from the plurality of sensors and the weld controller for determining a trajectory of a robotic device implemented in the weld operation.

In at least one exemplary embodiment, the method includes configuring a fourth stage of the weld system including a post welding inspection module to perform an automated inspection based on an adjusted weld schedule of the weld segment and the set of weld parts, and by fusing together the high and low-resolution data for quality analysis, to determine if a weld joint is stable, and the weld segment is compliant wherein the quality analysis uses a rule-based schema and a classification algorithm that receives input of fused high and low-resolution data for qualifying and classifying the weld joint.

In at least one exemplary embodiment, a welding apparatus is provided.

The welding apparatus at least includes a welding unit configured to: in a first stage of a scanning device, scan a workpiece including a set of weld parts to generate a three-dimensional (3D) profile of a weld target wherein the 3D profile captures matching imperfections caused by a meeting of the set of weld parts when performing a weld operation for joining of the set of weld parts; and in a second stage including a monitoring device, monitor the weld operation and to generate a data of high-resolution measurements of the weld operation; wherein the first stage further includes the monitoring device to determine a weld schedule based on the 3D profile of the weld target, and to adjust the weld schedule while the weld operation is in progress to adapted to a predicted distortion in a shape of the weld based on the 3D profile of the target weld, and by sensed distortion during the weld operation resulting from a combination of forces caused by a weld between the set of weld parts and a clamping force exerted on the workpiece; wherein the second stage further includes a plurality of sensors configured to sense a set of components associated with the weld operation to generate high-resolution data of measurements from direct and indirect sensing of measurements of the set of components associated with the weld operation in contrast to a low-resolution data of measurements provided by a weld controller.

In at least one exemplary embodiment, the welding apparatus includes the welding unit which is further configured to in the second stage, measure by the plurality of sensors the high-resolution data of measurements by at least one or more of a set of high-resolution sensors to provide direct measurements of the weld operation including a high-resolution current sensor, a high-resolution voltage monitor, and a high-resolution flow sensor; and in the second stage, measure by the plurality of sensors the high-resolution data of measurements by at least one or more of the plurality of sensors to provide indirect measurements of the weld operation including a microphone, a vibration meter, a plasma sensor, an ultra-violet sensor, a strain gauge sensor, a welding reaction force sensor, an electromagnetic spectrometer, a wire feed sensor, and an infrared camera.

In at least one exemplary embodiment, the welding apparatus includes wherein the welding unit is further configured to: in the first stage, configure a sensor including a wire, to enable by a touch action of wire that impinges at least one weld part of the set of weld parts, to determine a weld part position of the weld part prior to the weld operation wherein a weld part experiences the clamping force that holds together each weld part of the set of weld parts, and to measure by a tactile sense a change in the shape of the weld part position to determine the distortion in the shape of the weld part; and in the second stage configure the sensor that contains the wire as a consumable electrode that advances to the weld part to deposit a weld bead to form the weld segment of the weld between the set of weld parts and is further configured as a wire feed sensor to provide a measured melt rate of the consumable electrode in the weld operation.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, summary, or the following detailed description.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems and that the systems described herein are merely exemplary embodiments of the present disclosure.

The present disclosure describes systems, methods, and apparatuses that enable an adaptive welding process that implements a monitoring system that has more than one possible set of threshold limits (or quality determination rules) which can be applied to a weld operation based in part on a weld schedule selected or set of welding conditions.

The present disclosure describes systems, methods, and apparatuses that enable an adaptive welding schedule process of a welding operation by implementing a scanning operation of a workpiece to generate a three-dimensional (3D) profile of a weld target (i.e., the seam where the two pieces or weld parts to be welded are put together and are united, joined, met together, etc.) and based on the geometry of the weld parts generate the 3D weld profile of the target weld to which is based an appropriate weld schedule. In an embodiment, based on the 3D weld profile, a monitoring system is implemented to monitor or predict the distortion expected in the weld operation process as the weld is progressing in real-time, and to make adjustments in the weld schedule to prevent, or to optimize the weld operation (i.e., minimize abnormalities in the weld) while the welding is underway to attempt to correct any imperfections deemed likely to occur.

Figure 1:
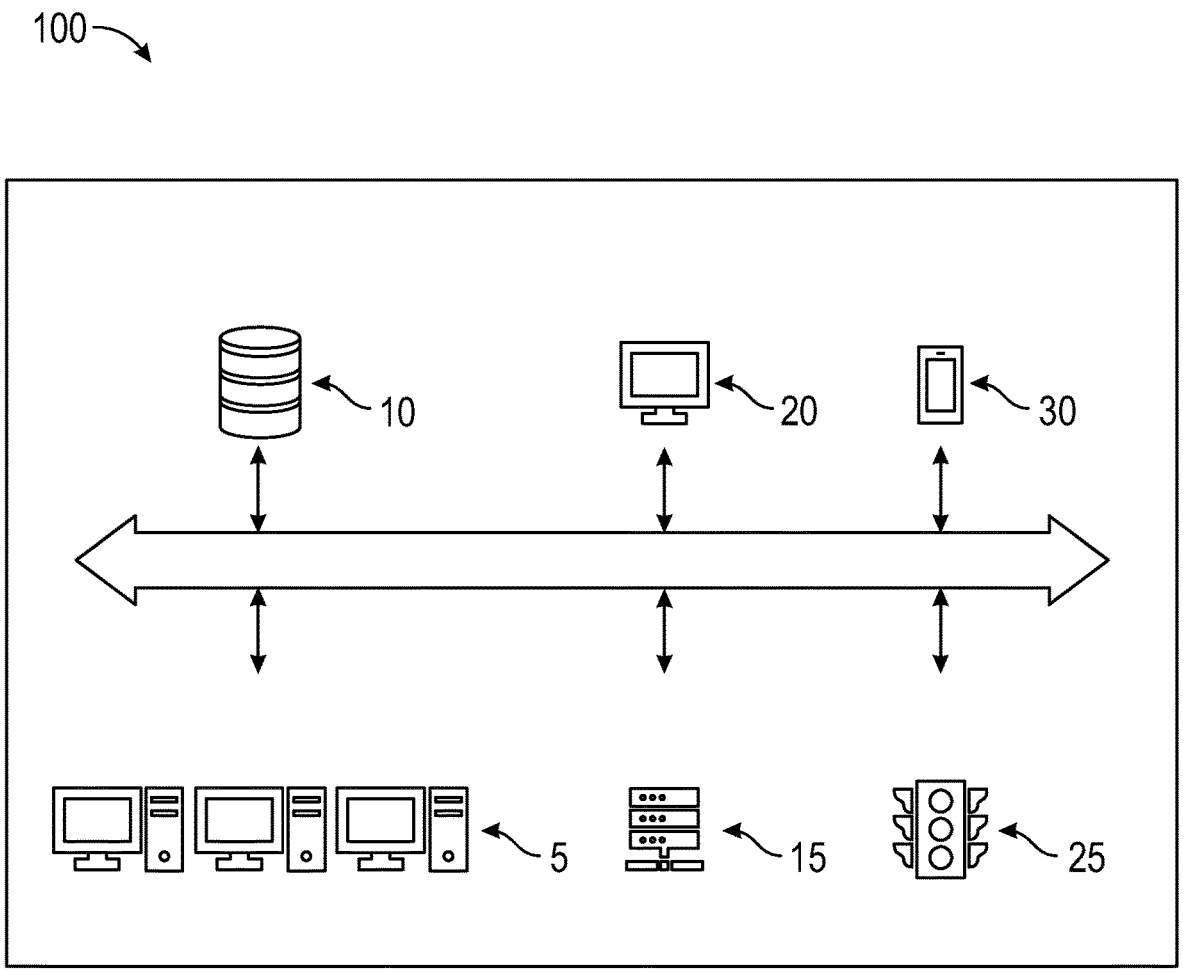
FIG. 1 illustrates an exemplary diagram of a welding system for monitoring weld operations, process data from the plurality of sensors in each stage of the welding process, and determine a weld qualification in accordance with exemplary embodiments.

FIG. 1 illustrates an exemplary diagram of a welding system 100 for monitoring weld operations (for a GMAW or other type of weld system including arc brazing, laser brazing, hybrid laser-arc welding, etc. . . . ), process data from the plurality of sensors in each stage of the welding process, and determine a weld qualification in accordance with an embodiment. In FIG. 1, the welding system 100 includes an edge computer system 5 configured with interfaces to receive input from sensors in the first, second, third, and fourth stages (described in FIG. 2). The edge computer system 5 may be locally hosted at a server 15 or remotely hosted in the cloud. In the depicted embodiment, the edge computer system 5 may be connected to a server 15, a signal repository, and database 10, and display 20 as well as to a mobile device 30 of a user. The edge computer system 5 may be a self-configured processor system from communications with the server 15 and include elements of a communication gateway controller, a block data processor communicatively coupled to internal or external memory, an internal storage device, an inter-processor bus, and an optional storage disk. In various embodiments, the edge computer system 5 performs actions and other functions related to the weld operation described further below in connection with FIGS. 2-4. The block data processor performs the computation and control functions attributed of algorithms programmed for the edge computer system 5 which may include various types of modules or multiple modules, single integrated circuits such as a micro module, or any suitable number of integrated circuit devices and/or circuit boards working in cooperation to carry out the described operations, tasks, and functions by manipulating electrical signals representing data bits at memory locations in the system memory, as well as other processing of signals.

During operation, the block data processor loads and executes one or more programs, algorithms, and rules embodied as instructions and applications (i.e., the machine learning algorithm) contained within the internal memory of the edge computer system 5 and, as such, controls the general operation of the control system of a communication gateway controller to execute the multiple functionalities in each stage of the welding process. In executing the processes described herein, the block data processor loads and executes at least a program.

For example, in an embodiment, a machine learning (ML) algorithm can be executed by the edge computer system 5 to monitor, make position determinations, and perform other quality-oriented processing steps in one or more stages of the weld operations. In an embodiment, the ML algorithm when executed may receive input of low and high-resolution data from multiple sensors. The ML algorithm can be configured to automatically receive quality input from a three-dimensional laser-scanned measurement of a completed weld to automatically assess weld quality (e.g a weld out of position, an excessive amount of weld expulsion). The implementation of such an ongoing process and training combined with different output from a plurality of modalities sensed (i.e., acoustic, electromagnetic vision force, and emissions) can provide assessments of the overall weld quality. For example, the data from the different modalities sensed can be correlated with weld quality sensors by the ML algorithm or other applications of the edge computer system 5 to detect excessive expulsion based on a signature analysis, and sound amplitude level.

In an embodiment, the edge computer system 5 is programmed with an intelligent (functional) algorithm to implement a weld monitoring rule based on a set of limitations configured for the weld operation that is derived from the algorithm based on an identified weld segment, the measured gap width of a set of weld parts, and the weld schedule.

In an embodiment, the edge computer system 5 is programmed to communicate with an interface to receive sensor data of 3D camera scans and can implement functional algorithms to measure deformations and strains of weld parts in real-time during the weld operation. The measurements taken can provide a basis to determine or estimate distortion, and residual stresses that can result from weld operations and clamping forces.

In an embodiment, the edge computer system 5 is programmed to fuse or combine datasets of high and low-resolution data sensed in the weld operation and from the weld controller can determine robot trajectories.

In an embodiment, the edge computer system 5 is programmed to combine pre-during and post-inspection data from a plurality of sensors as input to a classification algorithm that can determine quality using a rule-based decision-making process or Bayesian estimation to define a probability of having a conforming or nonconforming weld.

In an embodiment, the edge computer system 5 is programmed to receive data from a sensor that includes a welded wire configured in multiple modalities to sense the position of the weld joint and to estimate the magnitude of the gap between the substrate and use this information in conjunction with a classification algorithm to qualify the weld, predict a weld schedule, and make other related weld operation decisions.

In an embodiment, the edge computer system 5 is programmed to enable scan operations performed by a scanner device (scanner device 225 of FIG. 2) that can be a laser line scanner which is instructed to generate by an algorithm executed by the edge computer system 5, a three-dimensional (3D) profile of the weld target. The weld target is the seam where the two pieces or weld parts to be welded are put together and joined based on the geometry of the weld parts. In instances of the joining process, there can be imperfections caused by an inexact geometrical matching between both weld parts that can result in spacing or gap between both weld parts. The scan operations by the edge computer system using software applications can generate a 3D weld profile that recognizes the spacings and imperfections of the target weld when joining both weld parts, and can implement an adaptable weld schedule a weld scheduling application to compensate and adjust for the imperfections gleaned by the 3D weld profile.

The edge computer system 5 is configured with a computer-readable storage medium such as a memory, a storage device, or an optional storage disk that may be utilized as both storage and a scratchpad. The memory locations where data bits are maintained are physical locations that have particular electrical, magnetic, optical, or organic properties corresponding to the data bits. The memory can be any type of suitable computer-readable storage medium. For example, memory may include various types of dynamic random-access memory (DRAM) such as SDRAM, the various types of static RAM (SRAM), and the various types of non-volatile memory (PROM, EPROM, and flash). In certain examples, the memory is located on and/or co-located on the same computer chip as the block data processor. In the depicted embodiment, the memory stores the above-referenced instructions and applications along with one or more configurable variables in stored values.

The signal repository and database 10 is a computer-readable storage medium in the form of any suitable type of storage apparatus, including direct access storage devices such as hard disk drives, flash systems, floppy disk drives, and optical disk drives. In one exemplary embodiment, the signal repository and database 10 may include a program product from which memory of the edge computer system 5 which can also receive a program from the signal repository and database 10 or the server 15 and execute one or more embodiments of one or more processes of the present disclosure.

In another exemplary embodiment, the program product may be directly stored in and/or otherwise accessed by the memory of the server 15, the and/or a disk (e.g., optional storage disk), such as that referenced below.

The data records may be stored in the computer-readable storage medium, such as the memory. The internal buses communicate to transmit programs, data, status, and other information or signals between the various components of the welding system 100. The buses can be any suitable physical or logical means of connecting computer systems and components. This includes, but is not limited to, direct hard-wired connections, fiber optics, infrared, and wireless bus technologies. During operation, programs, stored in memory or the signal repository and database 10, are loaded and executed by block data processors for the edge computer system 5.

The interface (not shown) may also include one or more network interfaces to allow communication with external mobile devices, and/or manufacturing systems to permit communication with and potential storage of state information which ultimately can be placed into storage apparatuses, such as the signal repository and database 10.

Display 20 is configured to display a graphic user interface of analytics of each stage of the multi-stage welding system and data generated by the multiple sensors of low and high-resolution data in the corresponding stage for the user to view real-time visuals of the welding operations in the plant.

Figure 2:
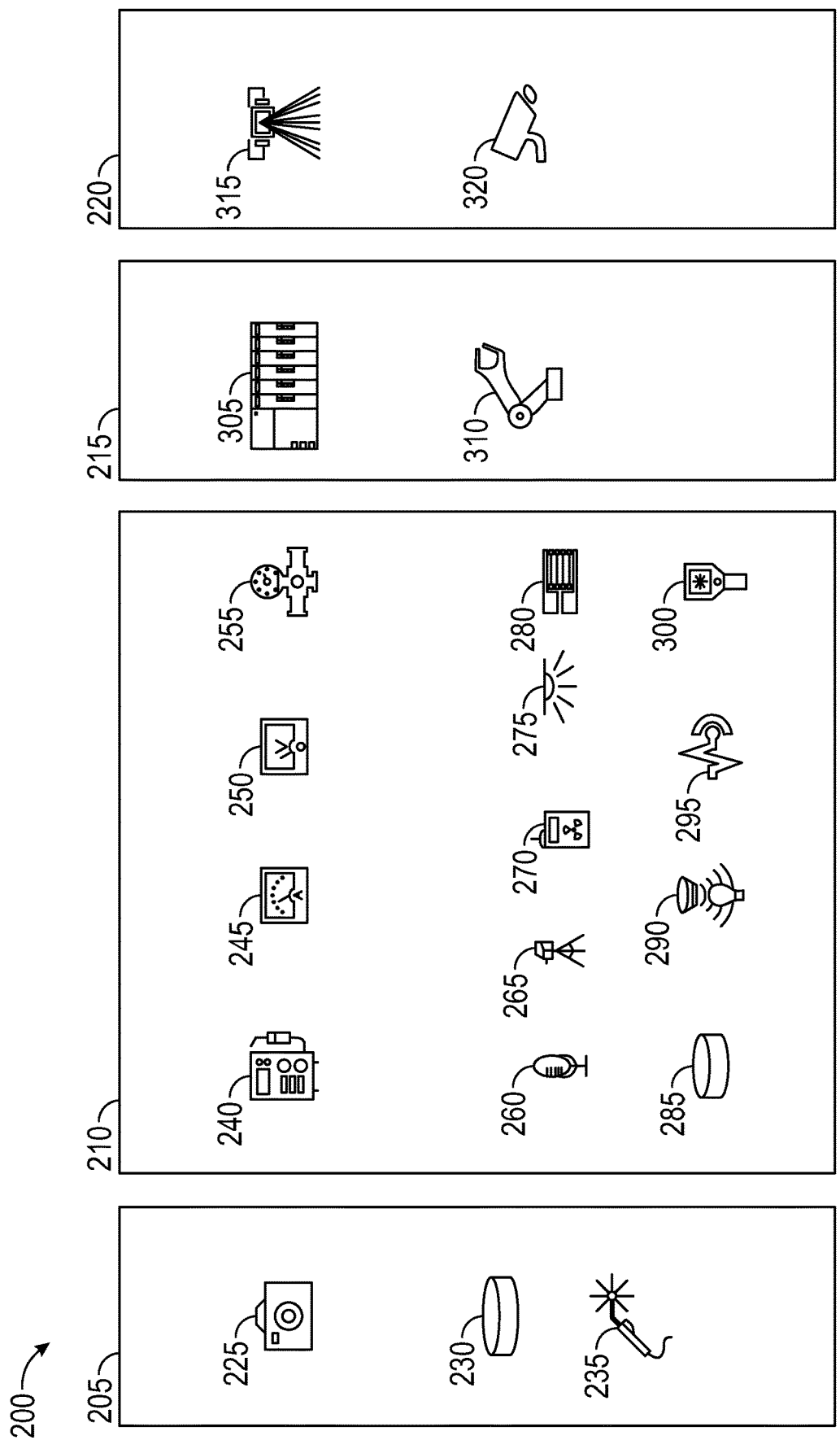
FIG. 2 illustrates multiple stages of the welding process and the multiple sets of sensors in each stage that generate high and low-resolution data about weld operations in accordance with exemplary embodiments.

FIG. 2 illustrates multiple stages of the welding process and the multiple sets of sensors in each stage that generate high and low-resolution data about weld operations in accordance with exemplary embodiments. In FIG. 2, in the exemplary diagram, there is depicted a first stage 205 for positioning of a weld part and a gap between a set of weld parts for application of the weld. The first stage 205 includes camera or scanner device 225 to determine the weld position and orientation gap between substrates or weld parts.

In an embodiment, the scanner device 225 is a laser line scanner that can be implemented to generate (by an algorithm executed by the edge computer system 5) a three-dimensional (3D) profile of the weld target (i.e., the seam where the two pieces or weld parts to be welded meet, and are put together and united, joined, etc.), based on the geometry of the weld parts. In instances, because of the geometry of each weld part, the match together of both parts is not perfect. There can be slight deviations resulting in a near-exact matching, joining, or meeting between both weld parts. The resultant meeting can realize a not perfected meeting with material or minute spacings or gaps between both weld parts. By implementing a scanning operation by the scanner device 225, and generating a 3D weld profile that includes the spacing or gap determined between both weld parts, the edge computer system 5 via a weld schedule application can determine based on the 3D weld profile an appropriate weld schedule that compensates or adjusts for the imperfections by the gap spacings in positioning and meeting of both parts of the workpiece.

In various exemplary embodiments, the edge computer system 5 can implement a set of predetermined weld schedules based on historical data that may be contained in the signal repository and database 10 or server 15. In an embodiment, based on the 3D weld profile, the edge computer system 5 can monitor, predict or correlate distortions or distortions that are expected in the weld operation process as the weld is in progress in real-time, and can adjust the weld schedule to prevent, or to optimize the weld operation while the welding is underway to attempt to correct any imperfections deemed likely to occur.

In an embodiment, in response to a change in the weld schedule, the algorithm implemented by the edge computer system 5 to monitor the welding process is also responsive to the change in the weld schedule. For example, dependent on changes in the weld schedule, the monitoring algorithm also may need to be correspondingly modified to adjust to different data gleaned about the weld operation and received as a result of a schedule change. For example, depending on the schedule of the weld that is implemented, the monitoring algorithm may have to change. That is, the same algorithm (or at least the same parameters even if the algorithm is the same) cannot be used for monitoring the weld operation if the weld schedule is changed.

In an embodiment, the information used in the prior weld schedule can be or is retained by the edge computer system 5 on which part of the weld can be performed by which schedule and then the applications of the edge computer system 5 can apply the appropriate classifier/algorithm to determine if the weld could be determined as an acceptable weld. In this regard, robotic kinematics capabilities are enabled for weld monitoring as well as using sensed measurements of the voltage, current, wire feed, gas flow, etc. Also, an adaptive monitoring algorithm based on the schedule of the weld is enabled in the weld operation with schedule awareness by combining the sensed data and schedule adjustments with a post-weld inspection to evaluate the final weld quality in the fourth stage 220 during the post-weld inspection.

In an embodiment, the weld schedule may refer to various aspects of weld that include the trajectory of the robot, speed of the robot (which may vary across the trajectory), the relative orientation of the torch (aka torch angle) of the robot along the trajectory, along with the amount of current and voltage used. The various component aspects of the robot may be changing (potentially) throughout the trajectory, the change that occurs along with weld operation details are captured by changes in the weld schedule.

In an embodiment, the scanner device 225 provides various 3D scanning capabilities and is implemented using a line scanner. In an embodiment, the line scanner, enables a laser line to be projected on a workpiece (i.e., the weld parts) from the scanner device 225. The distance of each point along the line from the scanner device 225 is measured, and some measurements include "height" information along the line that is determined is used to instruct the robotic arm movement. For example, if a line in an X-direction is determined and measured, then the robotic arm of a robot is configured to move along a Y-direction, and in each cycle of movement, by the robotic arm, the height (i.e., the Z-measurement) is determined where a Z location is determined for each X, Y location discovered. This movement of the robotic arm enables a 3D scan by the line scanner of the weld operation of the workpiece to be performed in line-by-line operations.

In an embodiment, a sensor 230 is implemented to measure the initial clamping force, and a tactile sensor 235 via a weld wire modulation to sense the position of the joint for the weld, and estimate the magnitude of the gap between weld parts (e.g., the gap between substrates) and the use of the information sensed and estimation of the position of the weld joint and gap magnitude as input to a classification algorithm executed by the edge computer system 5.

Continuing with reference to FIG. 2, the second stage 210 provides multiple sensors that enable monitoring of the progress of the weld in real-time by direct and indirect sensing. The weld controller 240 provides real-time low-resolution data of the weld operation that includes data of the weld controller current, weld controller voltage, gas flow, wire feed, and electrical impedance. For monitoring the weld, and to generate high-resolution data, a set of high-resolution sensors provide direct measurements of the weld operation and include a high-resolution current sensor 245, a high-resolution voltage monitor sensor 250, and a high-resolution flow sensor 255. Also provided are multiple sensors to provide indirect measurements of the weld operation and include a microphone 260, a vibration meter 265, a plasma sensor 270, an ultra-violet sensor 275, a strain gauge sensor 280, a welding reaction force sensor 285, an electro-magnetic spectrometer 290, the wire feed sensor 295, and an infrared camera 300.

The microphone 260 is capable of monitoring both ultrasonic frequencies and audible range frequencies of noises of the weld operation to measure the weld sound and ultra-sound emission in real-time where a small change in any of the parameters can signal a change in the weld quality. In an embodiment, a dual-microphone array can be provided in a metal inert gas (GMAW) robotic welding process, and arc sound features can be analyzed to obtain a relationship between the arc sound signal and the welding path deviation.

The strain gauge sensor 280 provides measurements exhibited by the weld part during the weld operation, and the measurement data is sent to the edge computer system 5 present estimations based on an algorithmic analysis of warping of the substrate in the operation. From this estimation, it can be determined whether the warping does not rise to a level that the part is not deemed at a required compliant level. Further, the strain gauge sensor 280 is attached to the substrate when making the measurements of the strain of the substrate in the weld operation.

The welding reaction force sensor 285 provides data from which the strength of the welded segment can be estimated by algorithms executed by the edge computer system 5 that are weighed to the clamping force that is applied to the position and hold the substrates or weld parts during the weld operation.

For welding that is performed with adaptive welding processes, the welding system 100 can monitor more than one possible set of threshold limits (e.g., by applying various quality determination rules) to a weld and the thresholds or rules implemented are also dependent on the weld schedule to perform the weld operations and operating conditions when the weld is performed. In an embodiment, the weld monitoring rule or limit is a function of the identified weld segment, the measured gap width, and the welding schedule. The weld operating conditions and schedule are monitored by the sensors that include the microphone 260, the vibration meter 265, the plasma sensor 270, the ultra-violet sensor 275, the strain gauge sensor 280, the welding reaction force sensor 285, the electromagnetic spectrometer 290, the wire feed sensor 295, and the infrared camera 300.

In an embodiment, the infrared camera 300 sensors is a 3-D camera that measures the deformation and strain of the weld parts in real-time during welding. The measurements can be used to estimate "distortion" and "residual stresses" resulting from welding.

In an embodiment, the edge computer system 5 utilizes an ML approach which utilizes automatic quality input from 3D laser scanning measurement (i.e., of completed weld to automatically assess weld quality (e.g weld out of position, excessive weld expulsion) by a laser scanner sensor. The laser scanner sensor can be mounted on the welding robot (i.e., robotic arm) close to the welding torch the scanning area, located directly in front of the welding electrode, is pre-calibrated with a supplied calibration plate (i.e., research modules and tools 335 of FIG. 3).

In an embodiment, the different modalities of the set of high-resolution sensors of a high-resolution current sensor 245, a high-resolution voltage monitor sensor 250, and a high-resolution flow sensor 255 that provide direct measurements, and the different modalities of the set of sensors that provide indirect measurements of the microphone 260, the vibration meter 265, the plasma sensor 270, the ultra-violet sensor 275, the strain gauge sensor 280, the welding reaction force sensor 285, the electromagnetic spectrometer 290, the wire feed sensor 295, and the infrared camera 300 are combined for sets of different sensing modalities (Acoustic, electromagnetic, vision, force, and emissions) from various steps of the welding process. The signals can correlate with output from a weld quality sensor 315 in the fourth stage 220 of a post-weld inspection to detect excessive expulsion based on signature analysis and sound amplitude level (i.e., detected sound from the microphone 260). The final part geometry wavelength is checked by camera 320 in the post-weld inspection and compared to data from the wire feed sensor 295 in the second stage 210, and initial positioning data from the camera or scanner device 225 in the first stage 205.

In an embodiment, the plasma sensor 270 detects a state of the gas used (i.e, how much plasma is used) in the weld operation, while the infrared sensor (i.e., infrared camera 300) is directed at the weld operation, and detects the heat given off by steps of the weld operation.

The third stage 215 of the welding system 200 includes process monitoring 305 and monitoring of the robotic arm 310. The process monitoring 305 includes ensuring the weld sequences are correct, ensuring the appropriate parts by identifying and tracking weld part numbers and tracking numbers associated with steps of the weld operation. Also, process monitoring 305 includes monitoring of the control system operations and operating conditions from data of the direct and indirect sensing of the weld operations. The monitoring of the robotic arm 310 includes monitoring of the weld schedule, the actual trajectory of the robotic arm 310 (i.e., ensuring proper compliance with data from the first stage 205 that generates information of the parts position and gap positions), tracking the actual velocity of the robotic arm 310 in performing the weld operation, determining the joint torque applied to the weld parts, and determining the actual acceleration of the robotic arm 310. The monitoring of the robotic arm 310 and the process monitoring 305 are performed by applications that include ML algorithms and programmed software of the edge computer system 5 that receives input sensor data.

Figure 3:
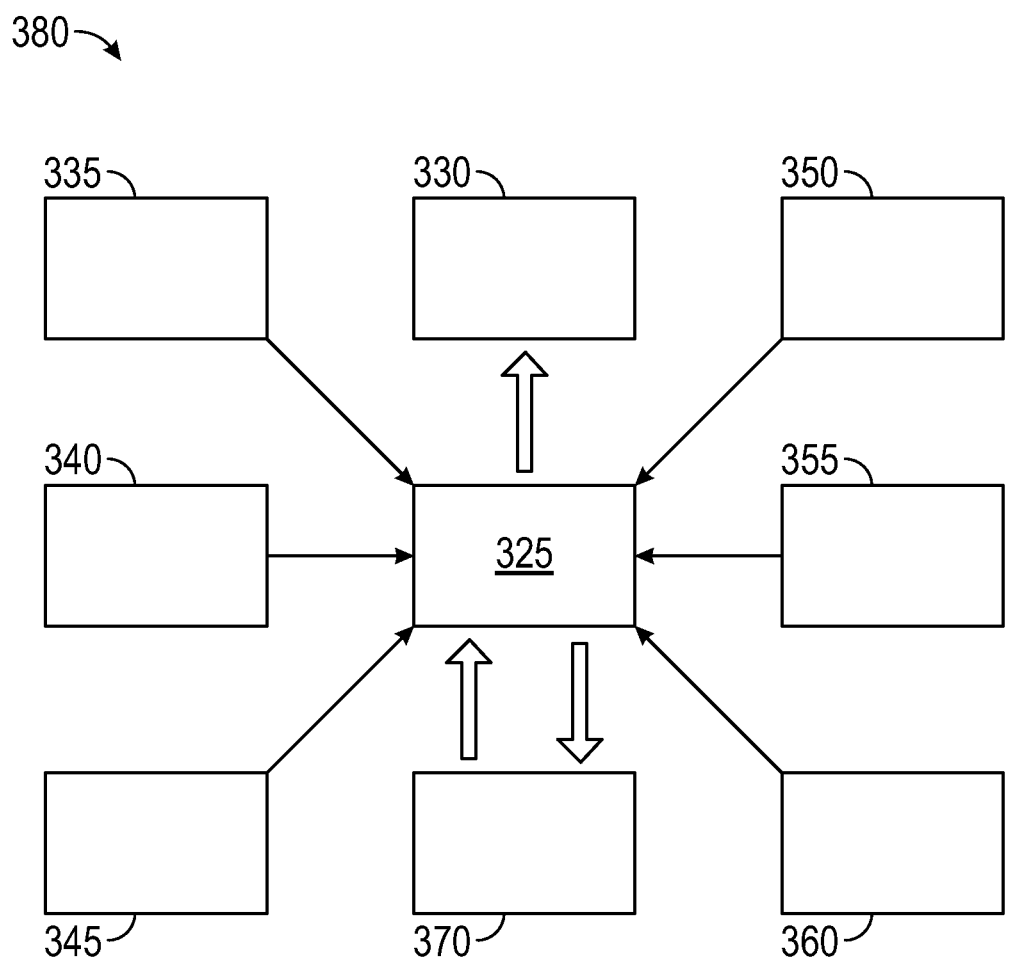
FIG. 3 illustrates an exemplary diagram of the receipt of data from multiple sensors with a wide set of sensing modalities that are used in tandem to assess the weld quality of the welding system in accordance with exemplary embodiments.

The fourth stage 220 for the post-weld inspection is directed to determining qualities associated with the aesthetic appeal or representation and to verify the integrity of the weld on both sides of the weld joint, as well as other aspects of the weld parts. For example, welding discontinuities that can be seen during the visual inspection such as undersized welds, undercut, overlap, surface cracking, surface porosity, underfill, incomplete root penetration, excessive root penetration, burn through, and excessive reinforcement. Also, determinations can be made based on tactile sensed data of deformations exhibited by the welded part, and estimations can be made via the edge computer system 5 of the quality of the weld joint without testing (i.e., non-destructive testing) that can cause defects in the weld joint or parts. Also, the post-weld inspection may make determinations of necessary amounts of polishing or smoothing of beading and FIG. 3 illustrates an exemplary diagram of a network 380 linking multiple sources communicating with the data repository 325 and the data repository 325 receiving data from multiple sensors with a wide set of sensing modalities that are used in tandem to assess the weld quality of the welding system in accordance with an embodiment. In FIG. 3, the data repository 325 (for example, receives data from multiple sources to send to a plant information system 330 (i.e. a remote server for plant operations), and for quality analysis 370 that can be performed at a cloud server, as an example, that aggregates multiple weld operational actions, and using complex ML algorithms makes quality, scheduling, process monitoring, and post-inspection determinations. In an embodiment, the quality analysis 370 can implement processes that combine pre-during and post-inspection data from the plurality of sensors (i.e., fusing the high-resolution data 345 and low-resolution data 350) as input to a classification algorithm that can qualify the weld using a rule-based schema that the weld is approved or not, or use Bayesian estimation to define a probability based on weld data (i.e., pre weld gap data 355, and post-weld bead profile data 360 as an example) that the weld is a conforming or non-conforming weld. Also, the quality analysis 370 can use the data from the weld wire modulation that senses the position of the weld joint and estimate the magnitude of the gap between substrate as input to the classification algorithm to classify and qualify the weld, for further inspection of the weld.

In an embodiment, the data repository 325 receives data and software modules and updates, from multiple sources that include research modules and tools 335 (i.e. for determining robotic kinematics, etc.); Programmable Logic Controller (PLC) weld metadata 340 for programming of robots; high-resolution data 345 of current amounts, wire feed, gas flow, etc.; weld controller low-resolution data 350 of current, voltage, wire-feed; pre-weld gap data 355 from a PLC network; and post-weld bead profile 360 data from the PLC network. The integration of the data from the multiple sensors (of FIG. 2) from a wide set of sensing modalities is used in tandem as depicted in FIG. 3, to assess the stability of the welding process and for exploiting assessments in each stage of the welding process augmented by sensor and process input to make determinations of aspects of weld quality, overall weld quality, and optimize scheduling and sequence flow of weld operations in a plant.

Figure 4:
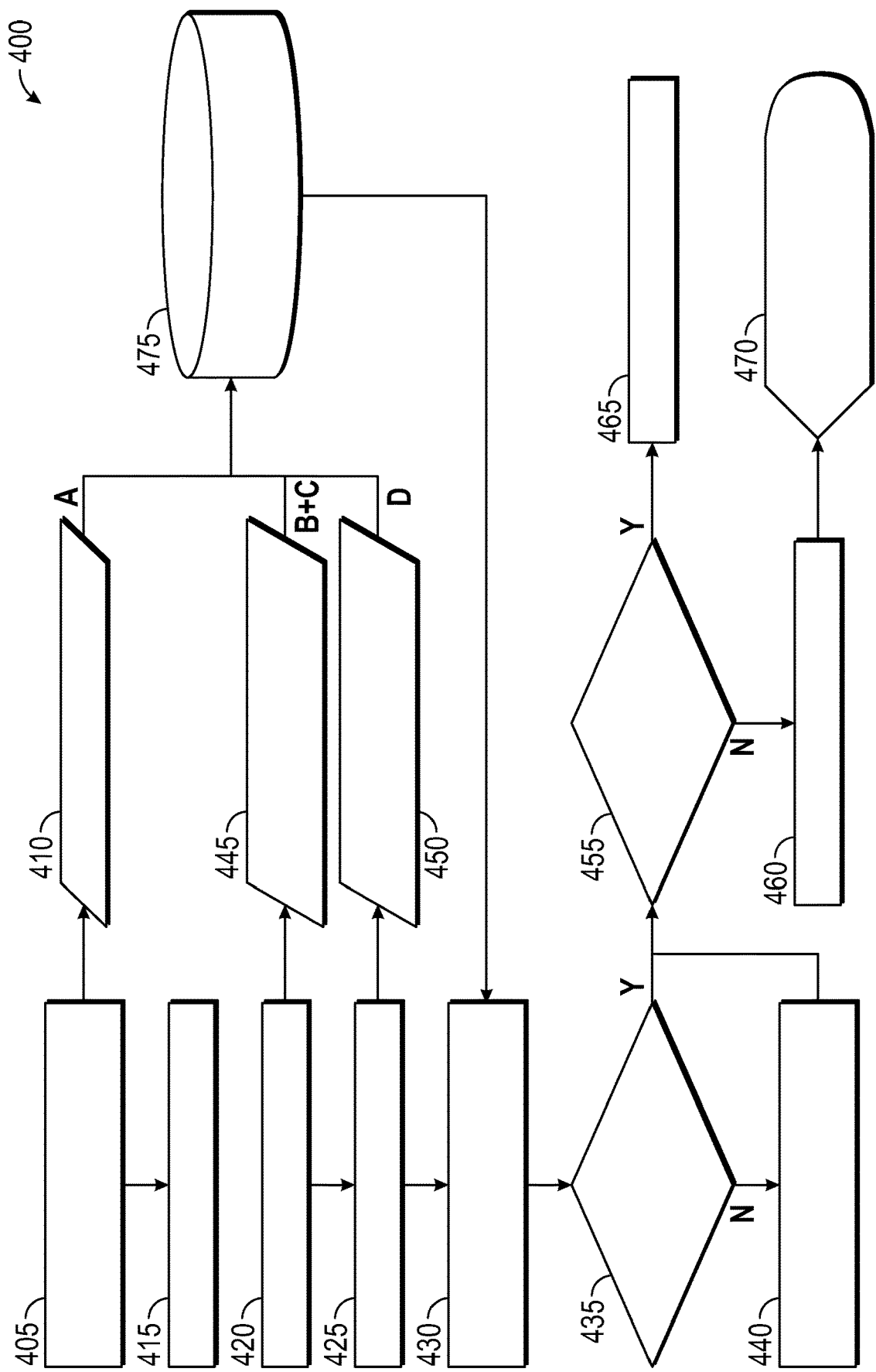
FIG. 4 illustrates an exemplary flow diagram of a weld operation of the welding system 100 in accordance with exemplary embodiments.

FIG. 4 illustrates an exemplary flow diagram of a weld operation 400 of the welding system 100 in accordance with exemplary embodiments. FIG. 4 includes step 405 for defining a weld seam configuration, step 410 for enabling the pre-weld inspection of stage one (FIG. 2) for weld part positioning and gap position, and for defining at step 415 the weld schedule.

In an embodiment, step 410 for enabling the pre-weld inspection in stage one (FIG. 2) can include scanning operations performed by the scanner device 225 that is a laser line scanner implemented to generate (by an algorithm executed by the edge computer system 5) a three-dimensional (3D) profile of the weld target (i.e., the seam where the two pieces or weld parts to be welded are put together and unite, join, meet, etc.), based on the geometry of the weld parts; for example, there can be a near-exact matching, joining or meeting between both weld parts, or there can be an inexact or not perfectly uniting or meeting that can result in spacing or gap between both weld part. By implementing the scanning operation and generating a 3D weld profile that includes the spacing or gap determined between both weld parts, the edge computer system 5 via a weld schedule application can determine based on the 3D weld profile an appropriate weld schedule.

In an embodiment, the pre-weld inspection at step 410 includes a tactile sensor made up of a wire that serves dual purposes to enable by a touch action that impinges the weld part to determine the position of the weld part prior to the weld operation and to form the consumable electrode in the weld joint. The weld part is also clamped at step 410 with a clamping force that holds together each weld part that makes up the weld joint. The tactile sensor is also used to measure by a tactile sense a change in the shape of at least one weld part position to determine a distortion in the shape of the weld part resulting from a combination of forces caused by the weld between the set of weld parts and the clamping force.

At step 420, the robotic welding via the robotic arm is initiated, and the welding process and monitoring data are generated in stages two and three (FIG. 2), and at step 425 an automated inspection is performed to generate post-welding inspection data.

In an embodiment, monitoring operations can be performed in step 420 and the automated inspection of step 425 can be performed based on the three-dimensional (3D) profile of the weld target of the geometry of the weld parts and the appropriate weld schedule that is implemented. In embodiments, a set of predetermined weld schedules based on historical data may also be implemented. In steps 420 and step 425, monitoring and correlating of distortion expected in the weld operation process as the weld is being done or in progress in real-time can be performed, and adjustments of the weld schedule to prevent, or to optimize the weld operation while the welding is underway to attempt to correct any imperfections deemed likely to occur can also be done.

In an embodiment, in response to a change in the weld schedule, the algorithm implemented by the edge computer system 5 to monitor the weld process is also responsive to the change in the weld schedule. For example, dependent on changes in the weld schedule, the monitoring algorithm also may need to be correspondingly modified to adjust different data about the weld operation generated and received as a result of the schedule change. For example, depending on the schedule of the weld implemented, the monitoring algorithm may have to change. That is, the same algorithm (or at least the same parameters even if the algorithm is the same) cannot be used for monitoring the weld operation if the schedule is changed.

In an embodiment, the information is retained by the edge computer system 5 on which part of the weld can be performed by which schedule and then can apply the appropriate classifier/algorithm to determine if the weld could be deemed as an acceptable weld. Hence, robotic kinematics capabilities are enabled for the weld monitoring as well as using the voltage, current, wire feed, gas flow, etc measurements. Also, an adaptive monitoring algorithm based on the schedule of the weld is used in the weld operation with schedule awareness by combining data of the adjusted weld schedule with a post-weld inspection to evaluate the final weld quality.

In an embodiment, the wire of the tactile sensor of the first stage used in the pre-weld inspection at step 410, is also used in step 445 to generate welding and process monitoring data of the wire configured consumable electrode advancing to the weld part for depositing a weld bead that forms the weld segment for the weld between the set of weld parts via a wire feed sensor that provides a measured melt rate of the consumable electrode in the weld operation. In step 445, the process monitored data is generated by multiple sets of sensors in the second stage sensing a set of components associated with the weld operation and generating the high-resolution data of measurements from direct and indirect sensing of measurements of the set of components associated with the weld operation in contrast to a low-resolution data of measurements provided by a weld controller. Also in step 445, a qualifying step of the weld segment formed by the weld operation based on a weld monitoring rule applied to a result of computation using a function of a measured weld part gap schedule. In embodiments, at step 445, a sound sensor of a microphone or microphone array may be implemented for monitoring ultrasonic frequencies and audible range frequencies of noises associated with the weld operation to determine whether the weld segment is compliant. At step 445, a strain gauge sensor attached to the weld part may be implemented for measuring a set of measurements exhibited by the weld part during the weld operation for determining a warping of the weld part and whether the warping of the weld part is beyond a compliant level.

At step 425 an automated inspection is generated and data is sent to step 450 for a post-welding inspection determination and to step 430 for a data fusion quality analysis. In an embodiment, the data fusion quality analysis of step 430 (i.e., quality analysis 370 of FIG. 3) can implement processes that combine pre, during, and post-inspection data from the plurality of sensors in steps 410, 445, and 450 of the weld process to process and fuse the high-resolution data and low-resolution data to classify using a classification algorithm the weld and to use data from the weld wire modulation that senses the position of the weld joint and estimates the magnitude of the gap between substrate as input to the classification algorithm to also classify and qualify the weld.

The post-welding inspection at step 450 performs a post-welding inspection by an automated inspection of the weld segment with the adjusted weld schedule and the set of weld parts, by using a camera/scanner to assess the geometry of the final welded part and the length of the final welded part. Also, at step 450 a post-inspection analysis may be performed by combining high and low-resolution data from the multiple sensors and the weld controller used in determining the trajectory of a robotic device implemented in the weld operation, for post-weld operation inspection.

In an embodiment, data generated by the pre-weld inspection (step 410) may also be combined with the data from step 445 of the welding and process monitoring, and with the data from step 450 of the post welding inspection data for further processing and to be sent for storing at the data and signal repository at step 475.

In an embodiment, at step 430, the data from the multiple sources from the multiple stages of the pre-weld inspection, welding, and process monitoring, post-weld inspection is analyzed via a data-fusion based quality analysis at step 430 via the edge computer system 5 (or at the server 15), to decide at step 435 the stability of weld performed in the welding process. In this regard, as an example, a rule-based schema is further implemented in the process flow for approving or not approving the weld, or alternatively using a Bayesian estimation process to define a probability based on weld data (i.e., pre weld gap data 355, and post-weld bead profile data 360 as an example) that the weld is a conforming or non-conforming weld.

In an embodiment, if based on criteria of components and thresholds for each of a set of components identified in the welding process, it is determined that the process is not stable, then at step 440, a second non-destructive evaluation (NDE) is performed (i.e., CT scan, selective cut/etch operation, etc.) and the process is again rechecked for stability. If the process is stable, then at step 455, a process rule function is applied to determine if the weld is compliant (i.e., the rule-based schema). If the weld is deemed compliant, then at step 465 the weld is approved, if not then at step 460 it is rejected. At step 470, the non-conforming or rejected portion of the weld, or weld part is indicated and the non-conforming portion is sent for further inspection (i.e., manual inspection).

It should be appreciated that the process of FIG. 4 may include any number of additional or alternative tasks, the tasks are shown in FIG. 4 need not be performed in the illustrated order, and the process of FIG. 4 may be incorporated into a more comprehensive procedure or process having additional functionality not described in detail herein. Moreover, one or more of the tasks shown in FIG. 4 may be omitted from an embodiment of the process shown in FIG. 4 as long as the intended overall functionality remains intact.

The foregoing detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, or detailed description.

While at least one exemplary embodiment has been presented in the foregoing detailed description, it should be appreciated that a vast number of variations exist. It should also be appreciated that the exemplary embodiment or exemplary embodiments are only examples and are not intended to limit the scope, applicability, or configuration of the disclosure in any way. Rather, the foregoing detailed description will provide those skilled in the art with a convenient road map for implementing the exemplary embodiment or exemplary embodiments.

It should be understood that various changes may be made in the function and arrangement of elements without departing from the scope of the disclosure as set forth in the appended claims and the legal equivalents thereof.

What is claimed is:

1. A weld system comprising:
   a first stage of a scanning device for scanning a workpiece comprising a set of weld parts to generate a three-dimensional (3D) profile of a weld target wherein the 3D profile captures matching imperfections caused by a meeting of the set of weld parts when performing a weld operation for joining the set of weld parts;
   a second stage of a monitoring device to monitor the weld operation and to generate a data of high-resolution measurements of the weld operation;
      wherein the first stage further comprises the monitoring device to determine a weld schedule based on the 3D profile of the weld target, and to adjust the weld schedule while the weld operation is in progress to adapt to a predicted distortion in a shape of the weld based on the 3D profile of the target weld and sensed distortion during the weld operation resulting from a combination of forces caused by a weld between the set of weld parts and a clamping force exerted on the workpiece, and
      wherein the second stage further comprises a plurality of sensors configured to sense a set of components associated with the weld operation to generate high-resolution data of measurements from direct and indirect sensing of measurements of the set of components associated with the weld operation in contrast to a low-resolution data of measurements provided by a weld controller, wherein:
         at least one or more of the plurality of sensors to provide indirect measurements of the weld operation comprise a microphone, a strain gauge sensor, and a welding reaction force sensor,
         the microphone is configured to monitor ultrasonic frequencies and audible range frequencies of noises associated with the weld operation to determine whether a weld segment is compliant,
         the strain gauge sensor is configured to measure a set of measurements exhibited by the weld part during the weld operation to determine a warping of the weld part and whether the warping of the weld part is beyond a compliant level, the strain gauge sensor being attached to the weld part, and
         the welding reaction force sensor is configured to determine a strength of the weld segment in contrast to the clamping force applied to the weld part;
   a third stage of a processing monitoring module configured to qualify the weld segment formed by the weld operation based on a weld monitoring rule applied to a result of computation using a function of a measured weld part gap schedule; and
   a fourth stage of a post welding inspection module configured to perform an automated inspection of the weld segment and the set of weld parts by using at least one of a camera and a scanner to assess a geometry of the welded part and a length of the welded part and that classifies the weld operation using a classification algorithm that evaluates a fusion of the high-resolution data and the low-resolution data and the adjusted weld schedule.

2. The weld system of claim 1, further comprising:
wherein in the second stage, the plurality of sensors that provides the high-resolution data of measurements comprises at least one or more of a set of sensors to provide direct measurements of the weld operation of a high-resolution current sensor, a high-resolution voltage monitor sensor, and a high-resolution flow sensor.

3. The weld system of claim 2, further comprising:
wherein in the second stage, the plurality of sensors that provides the high-resolution data of measurements comprises at least one or more of the plurality of sensors to provide indirect measurements of the weld operation of a vibration meter, a plasma sensor, an ultra-violet sensor, an electromagnetic spectrometer, a wire feed sensor, and an infrared camera.

4. The weld system of claim 1, further comprising:
wherein the first stage further comprises a sensor comprising a wire to enable by a touch action that impinges at least one weld part of the set of weld parts, to determine a weld part position prior to the weld operation wherein a weld part experiences the clamping force that holds together each weld part of the set of weld parts, and to measure by a tactile sense a change in the shape of the weld part position to determine the distortion in shape of the weld part; and
wherein the second stage further comprises the sensor that contains the wire wherein the wire is configured as a consumable electrode that advances to the weld part to deposit a weld bead to form a weld segment of the weld between the set of weld parts and is further configured as a wire feed sensor to provide a measured melt rate of the consumable electrode in the weld operation.

5. The weld system of claim 1, further comprising:
the process monitoring module is configured to combine the high and low-resolution data from the plurality of sensors and the weld controller to determine a trajectory of a robotic device implemented in the weld operation, and wherein the fourth stage uses the trajectory in the automated inspection.

6. The weld system of claim 5, further comprising:
the fourth stage of the weld system comprising a quality analysis to determine if a weld joint is stable that uses the classification algorithm.

7. The weld system of claim 6 further comprising:
the fourth stage of the weld system comprising the quality analysis further using a rule based schema to define whether the weld is conforming or non-conforming.

8. The weld system of claim 6 further comprising:
the fourth stage of the weld system comprising the quality analysis further using a Bayesian estimation process to define a probability that the weld is a conforming weld or a non-conforming weld.

9. A method for monitoring a weld operation, comprising:
configuring a weld system by a first stage of a scanning device for scanning a workpiece comprising a set of weld parts to generate a three-dimensional (3D) profile of a weld target wherein the 3D profile captures matching imperfections caused by a meeting of the set of weld parts when performing the weld operation for joining of the set of weld parts;
configuring of the weld system by a second stage of a monitoring device for monitoring the weld operation and for generating high-resolution data of measurements of the weld operation;
configuring the monitoring device by the first stage for determining a weld schedule based on the 3D profile of the weld target, and for adjusting the weld schedule while the weld operation is in progress for adapting to a predicted distortion in a shape of the weld based on the 3D profile of the target weld, and for adapting to sensed distortion during the weld operation resulting from a combination of forces caused by a weld between the set of weld parts and a clamping force exerted on the workpiece;
configuring a plurality of sensors in the second stage for sensing a set of components associated with the weld operation for generating high-resolution data of measurements from direct and indirect sensing of measurements of the set of components associated with the weld operation in contrast to a low-resolution data of measurements provided by a weld controller, at least one or more of the plurality of sensors to provide indirect measurements of the weld operation comprising a microphone, a strain gauge sensor, and a welding reaction force sensor;
configuring the microphone for monitoring ultrasonic frequencies and audible range frequencies of noises associated with the weld operation for determining whether the weld segment is compliant;
configuring the strain gauge sensor for measuring a set of measurements exhibited by the weld part during the weld operation for determining a warping of the weld part and whether the warping of the weld part is beyond a compliant level wherein the strain gauge sensor is attached to the weld part;
configuring the welding reaction force sensor for determining a strength of the weld segment in contrast to the clamping force applied to the weld part;
configuring a weld system by a third stage of a processing monitoring module for qualifying the weld segment formed by the weld operation based on a weld monitoring rule applied to a result of computation using a function of a measured weld part gap schedule; and
configuring a weld system by a fourth stage of a post welding inspection module for performing an automated inspection of the weld segment and the set of weld parts by using at least one of a camera and a scanner to assess a geometry of the welded part and a length of the welded part and that classifies the weld operation using a classification algorithm that evaluates a fusion of the high-resolution data and the low-resolution data and the adjusted weld schedule.

10. The method of claim 9, further comprising:
configuring, in the second stage, the plurality of sensors for providing the high-resolution data of measurements by at least one or more of a set of sensors providing direct measurements of the weld operation comprising a high-resolution current sensor, a high-resolution voltage monitor sensor, and a high-resolution flow sensor.

11. The method of claim 10, further comprising:
configuring, in the second stage, the plurality of sensors for providing the high-resolution data of measurements by at least one or more of the plurality of sensors providing indirect measurements of the weld operation comprising, a vibration meter, a plasma sensor, an ultra-violet sensor, an electromagnetic spectrometer, a wire feed sensor, and an infrared camera.

12. The method of claim 9, further comprising:
configuring a sensor of the first stage comprising a wire for enabling by a touch action that impinges at least one weld part of the set of weld parts, for determining a weld part position prior to the weld operation wherein a weld part experiences the clamping force that holds together each weld part of the set of weld parts, and for measuring by a tactile sense a change in the shape of the weld part position to determine the distortion in shape of the weld part; and
configuring by the sensor of the second stage that contains the wire wherein the wire is configured as a consumable electrode that advances to the weld part to deposit a weld bead to form the weld segment of the weld between the set of weld parts and is further configured as a wire feed sensor for providing a measured melt rate of the consumable electrode in the weld operation.

13. The method of claim 9, further comprising:
configuring the process monitoring module for combining high and low-resolution data from the plurality of sensors and the weld controller for determining a trajectory of a robotic device implemented in the weld operation, and wherein the fourth stage uses the trajectory in the automated inspection.

14. The method of claim 13, further comprising:
configuring the fourth stage of the weld system for a quality analysis to determine if a weld joint is stable that uses the classification algorithm.

15. A welding apparatus, comprising:
a welding unit configured to:
in a first stage comprising a scanning device, scan a workpiece comprising a set of weld parts to generate a three-dimensional (3D) profile of a weld target, wherein the 3D profile captures matching imperfections caused by a meeting of the set of weld parts when performing a weld operation for joining of the set of weld parts;
in a second stage comprising a monitoring device, monitor the weld operation to generate a high-resolution data of measurements of the weld operation;
wherein the first stage further comprises the monitoring device configured to determine a weld schedule based on the 3D profile of the weld target, and to adjust the weld schedule while the weld operation is in progress to adapt to a predicted distortion in a shape of the weld, the predicted distortion is based on the 3D profile of the target weld and sensed distortion during the weld operation resulting from a combination of forces caused by a weld between the set of weld parts and a clamping force exerted on the workpiece;
wherein the second stage further comprises a plurality of sensors configured to sense a set of components associated with the weld operation to generate high-resolution data of measurements from direct and indirect sensing of measurements of the set of components associated with the weld operation in contrast to a low-resolution data of measurements provided by a weld controller, wherein:
at least one or more of the plurality of sensors to provide indirect measurements of the weld operation comprise a microphone, a strain gauge sensor, and a welding reaction force sensor,
the microphone is configured to monitor ultrasonic frequencies and audible range frequencies of noises associated with the weld operation to determine whether a weld segment is compliant,
the strain gauge sensor is configured to measure a set of measurements exhibited by the weld part during the weld operation to determine a warping of the weld part and whether the warping of the weld part is beyond a compliant level, the strain gauge sensor being attached to the weld part, and
the welding reaction force sensor is configured to determine a strength of the weld segment in contrast to the clamping force applied to the weld part;
in a third stage comprising a processing monitoring module, qualify the weld segment formed by the weld operation based on a weld monitoring rule applied to a result of computation using a function of a measured weld part gap schedule; and
in a fourth stage comprising a post welding inspection module, perform an automated inspection of the weld segment and the set of weld parts by using at least one of a camera and a scanner to assess a geometry of the welded part and a length of the welded part and that classifies the weld operation using a classification algorithm that evaluates a fusion of the high-resolution data and the low-resolution data and the adjusted weld schedule.

16. The welding apparatus of claim 15, further comprising:
wherein the welding unit is further configured to:
in the second stage, measure by the plurality of sensors the high-resolution data of measurements by at least one or more of a set of high-resolution sensors to provide direct measurements of the weld operation comprising a high-resolution current sensor, a high-resolution voltage monitor, and a high-resolution flow sensor; and
in the second stage, measure by the plurality of sensors the high-resolution data of measurements by at least one or more of the plurality of sensors to provide indirect measurements of the weld operation comprising a vibration meter, a plasma sensor, an ultra-violet sensor, an electromagnetic spectrometer, a wire feed sensor, and an infrared camera.

17. The welding apparatus of claim 16, further comprising:
wherein the welding unit is further configured to:
in the first stage, configure a sensor comprising a wire, to enable by a touch action of wire that impinges at least one weld part of the set of weld parts, to determine a weld part position of the weld part prior to the weld operation wherein a weld part experiences the clamping force that holds together each weld part of the set of weld parts, and to measure by a tactile sense a change in the shape of the weld part position to determine the distortion in shape of the weld part; and
in the second stage configure the sensor that contains the wire, configure the wire as a consumable electrode that advances to the weld part to deposit a weld bead to form the weld segment of the weld between the set of weld parts and is further configured as a wire feed sensor to provide a measured melt rate of the consumable electrode in the weld operation.

18. The welding apparatus of claim 15, wherein the process monitoring module is configured to combine the high and low-resolution data from the plurality of sensors and the weld controller to determine a trajectory of a robotic device implemented in the weld operation, and wherein the fourth stage uses the trajectory in the automated inspection.

19. The welding apparatus of claim 15, wherein the fourth stage of the weld system comprises a quality analysis to determine if a weld joint is stable that uses the classification algorithm.

20. The welding apparatus of claim 15, wherein the fourth stage of the weld system comprises the quality analysis further using a Bayesian estimation process to define a probability that the weld is a conforming weld or a non-conforming weld.

* * * * *